Figure 1:
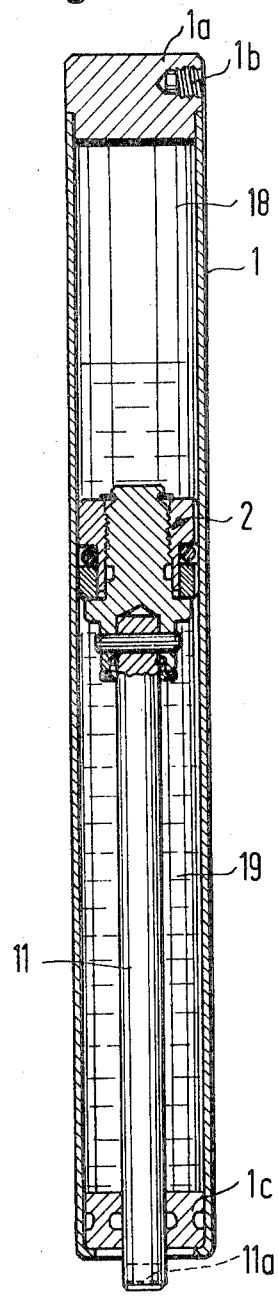

United States Patent

[11] 3,628,637

[72] Inventor Ludwig Axthammer
 Garmisch-Partenkirchen, Germany
[21] Appl. No. 11,946
[22] Filed Feb. 17, 1970
[45] Patented Dec. 21, 1971
[73] Assignee Fichtel & Sachs Aktiengesellschaft
 Schweinfurt am Main, Germany
[32] Priority Mar. 22, 1967
[33] Germany
[31] F 51 907
 Continuation-in-part of application Ser. No.
 707,846, Feb. 23, 1968, now Patent No.
 3,503,472. This application Feb. 17, 1970,
 Ser. No. 11,946

[54] EXTENDABLE SUPPORT COLUMN
 9 Claims, 2 Drawing Figs.
[52] U.S. Cl. .................................................... 188/300,
 188/316, 248/354 H
[51] Int. Cl. ...................................................... F16d 63/00
[50] Field of Search ........................................... 188/271,
 300, 316, 319; 248/354 H

[56] References Cited
UNITED STATES PATENTS
3,376,957 4/1968 Baumgartner ................ 188/316

Primary Examiner—George E. A. Halvosa
Attorney—Kelman and Berman

ABSTRACT: A hydropneumatic support column for a table top or the like has a cylinder, a two-part piston in the cylinder and a piston rod extending outwardly of the cylinder. Respective axial faces of the two piston parts conformingly engage axially spaced portions of the inner cylinder wall, and spacedly opposite radial walls of the piston parts bound a receptacle for an O-ring dimensioned to define a gap with the inner cylinder wall in the relaxed position. The inner end of the piston rod threadedly engages one piston part and abuttingly engages the other so that the resilient O-ring may be axially compressed between the radial walls of the piston parts by turning the external portion of the piston rod until it closes the gap, thereby breaking communication between two axial grooves in the piston parts which jointly connect the two compartments on opposite sides of the piston when the gap is open.

PATENTED DEC 21 1971 3,628,637

INVENTOR.
Ludwig Axthammer
By: Kelman and Berman
AGENTS.

EXTENDABLE SUPPORT COLUMN

This application is a continuation-in-part of my copending application, Ser. No. 707,846, filed on Feb. 23, 1968, now U.S. Pat. No. 3,503,472.

This invention relates to support columns of adjustable length, and particularly to extendable columns in which a piston is axially movable in a sealed, fluid-filled cylinder and axially divides the cylinder cavity into two compartments. A piston rod extends from the piston axially outward of the cylinder. The cylinder and piston rod are interposed between the object to be supported and the ground or floor. The axial length of the column can be changed only when the two compartments are connected through a valved bypass duct.

Columns of the type described depend for operativeness on a tight seal between the piston and the inner wall of the cylinder. Even a slight leak between piston and cylinder wall causes the column to change in length under an applied load or under internal pressure whichever prevails.

It has therefore been common practice heretofore to provide the piston with at least one sealing ring of resilient material whose outer diameter in the relaxed condition is greater than the inner diameter of the cylinder so that the ring is strongly stressed in compression at all times. The resulting contact pressure between the ring and the cylinder wall causes considerable friction.

The known columns employing resilient sealing rings on the piston inherently have limited transverse rigidity when extended. When a major portion of the piston rod projects from the cylinder, good transverse rigidity of the column requires precise guiding of the rod in a radial end wall of the cylinder and by the piston. If the radial position of the piston is determined by a resilient sealing ring, the longitudinal axis of the rod is not held parallel to the cylinder axis with sufficient precision to prevent bending stresses to be generated in the column by an applied load. Such stresses cause rapid deterioration of the seals at the two guiding points of the rod and premature failure of the column.

If the column is filled partly with liquid and partly with a gas under a pressure sufficiently higher than atmospheric pressure, the column expands spontaneously when relieved of an external load as soon as the bypass duct is opened. The internal gas pressure required depends to a significant extent on the friction between the piston and the cylinder wall. An interposed, strongly compressed sealing ring requires the column to be operated under a much higher gas pressure than would otherwise be needed, and all other features of the column must be adjusted to the higher operating pressure.

The hydropneumatic columns referred to are normally shortened by manually pushing the piston rod inward of the cylinder against the pressure of the gas. The force required for reducing the length of the column is greatly increased by high friction between a sealing ring on the piston and the inner cylinder wall, and is additionally increased by the need for operating at relatively high internal gas pressure as described in the preceding paragraph.

The useful life of a column of the type described is mainly determined by the wear of the sealing ring. Some such columns are lengthened and shortened relatively frequently, as in a table which may serve as a dining table when supported by fully extended columns, and as a coffee table when supported on the same columns reduced to their minimum length. The contact pressure between the sealing ring and the inner cylinder wall during their relative sliding movement is a major factor in determining the rate of wear of the ring. The greater the pressure, the shorter the useful life of the sealing ring under otherwise identical conditions.

The primary object of the invention is the provision of a column of the type described in which the contact pressure between a sealing member on the piston and the inner wall of the cylinder is insignificant while the length of the column is being changed, whereby the aforementioned shortcomings of the known extendable columns are avoided.

Another object is the provision of a column of the type described which is simple in its design, has few and rugged parts, yet is reliable in its operation and of high rigidity.

With these and other objects in view, the invention, in one of its aspects, resides in a column having a two-part piston. The two piston members have respective axial faces which conformingly engage two axially spaced portions of the inner cylinder face, and respective radially extending faces spaced opposite each other so as axially to bound a receptacle therebetween. The axial walls of the receptacle are provided by the inner cylinder face and one of the piston members. Each piston member is formed with a conduit having an orifice in the receptacle and an orifice in one of the two compartments into which the cylinder cavity is divided by the piston.

A terminal portion of the piston rod in the cylinder cavity threadedly engages one of the piston members and is connected with the other, exterior terminal portion of the piston rod for joint angular movement in respective planes perpendicular to the cylinder axis, and usually about the cylinder axis. An abutment on the inner piston rod end moves the other piston member inwardly of the aforementioned receptacle toward the threadedly engaged piston member when the exterior piston rod end is turned.

A resilient member interposed between the radial faces of the piston members in the receptacle is dimensioned so as to define a gap with one of the axial receptacle walls when in the relaxed condition, the gap connecting the orifices of the two conduits in the receptacle. When compressed between the radial piston faces, the resilient member engages the last-mentioned axial wall and thereby closes the gap and prevents flow of fluid between the cylinder compartments.

Figure 2:
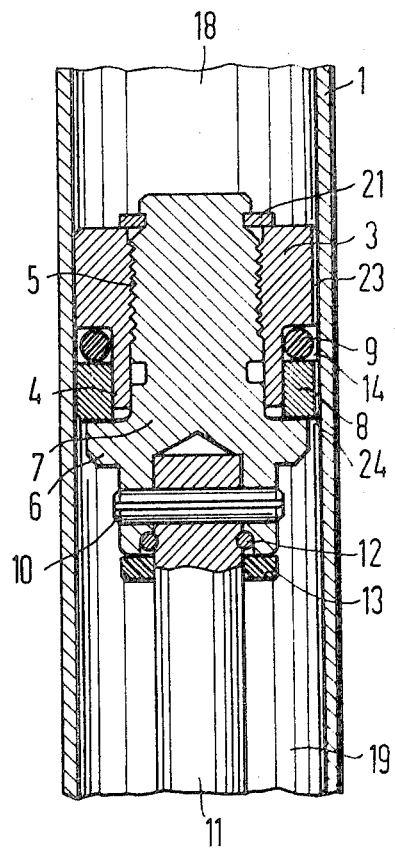

Other features, additional objects and many of the attendant advantages of this invention will readily be appreciated as the same becomes better understood by reference to the following detailed description of preferred embodiments when considered in connection with the accompanying drawing, in which:

FIG. 1 shows a hydropneumatic support column of the invention in axial section, its bypass duct being open; and FIG. 2 shows a portion of the column of FIG. 1 on a larger scale.

Referring now to the drawing in detail, and initially to FIG. 1, there is seen a hollow cylinder 1 whose axial ends are sealed respectively by an imperforate plug 1a provided with a blind, radial, threaded bore 1b, and by an annular plug 1c slidably receiving a piston rod 11. The portion of the piston rod projecting from the plug 1c is provided with a radial threaded bore 11a. The bores 1b and 11a may be used for attaching the piston rod 11 to a base and the cylinder 1 to a table top which is to be supported at an adjustable height by the illustrated column.

A two-part piston 2 attached to the piston rod 11 divides the cylinder cavity into two compartments 18, 19 whose capacity varies during axial movement of the piston. The lower compartment 19 and an axial portion of the upper compartment 18 near the piston are filled with liquid, while the remainder of the compartment is occupied by a cushion of compressed air.

As is better seen in FIG. 2, piston member 3, 4 is a tube whose bore is provided with threads 5 over much of its length. The upper axial portion 3 of the piston member has an outer face which conformingly engages the uniformly cylindrical inner face of the cylinder 1 with a sliding fit. The lower axial portion 4 of the piston member also has a cylindrical outer face but of reduced diameter. The other piston member 8 is a short cylindrical tube which slidably receives the reduced portion 4 of the piston member in its bore and whose outer axial face conforms to the inner cylinder face.

Spacedly opposite radial faces of the two piston members axially bound an annular receptacle 14 which is bounded radially by the outer face of the reduced piston member portion 4 and by the inner cylinder face. An O-ring 9 of resilient rubber or plastic composition is received in the receptacle 14, its dimensions being chosen so that it radially defines a gap with the inner cylinder face when in the illustrated relaxed condition in which the ring is substantially tore-shaped. Axial grooves 23 in the otherwise smoothly cylindrical, outer face of the piston portion 3 have orifices in the compartment 18 and in the receptacle of the ring 9 so as to provide a conduit for fluid flow between the compartment 18 and the gap between the ring 9 and the cylinder 1. The piston member 8 is formed with a corresponding conduit formed by grooves 24 having orifices in the compartment 19 and in the gap between the ring 9 and the cylinder 1.

The upper or interior terminal portion of the piston rod 11 is a plug 7 which threadedly engages the threads 5 in the bore of the piston member 3, 4. A portion of the plug 7 downwardly projects from the bore of the piston member 3, 4 and has an integral collar 6 which abuttingly engages the radial face of the piston member 8 remote from the O-ring 9 under all normal operating conditions. A downwardly open bore of the plug 7 receives the smoothly cylindrical portion of the piston rod 11, relative angular movement in a plane perpendicular to the cylinder axis being prevented by a transverse pin 10 which passes radially through both piston rod portions, the connection being axially secured by a ring 12 of spring wire received simultaneously in circumferential grooves of both portions. A rubber ring 13 on the cylindrical piston rod portion contiguously adjacent the plug 7 cushions the impact of the plug 7 and of the attached piston against the plug 1c during outward travel of the piston rod 11. Axial downward movement of the plug 7 from the position shown in FIG. 2 is prevented by a snap ring 21 on the plug 7 engaging the piston portion 3 and thus avoiding disengagement of the piston rod from the piston.

In the illustrated condition of the piston 2, the two compartments 18, 19 communicate with each other through the throttling passage provided by the conduits 23, 24. Depending on the magnitudes of an applied external load and of the gas pressure of the air cushion, the piston 2 and piston rod 11 may be in equilibrium in the illustrated position. They can readily be shifted by increasing or decreasing the external load.

When it is desired to fix the length of the column, the outer terminal portion of the piston rod 11 is turned relative to the cylinder 1 about the cylinder axis to shift the plug upwardly on the threads 5. Such turning may be facilitated by inserting threaded, straight rods in the bores 1b, 11a. Friction between the piston 2 and the inner wall of the cylinder 1 is normally sufficient for initially impeding rotation of the piston, but the piston portion 3 and the inner cylinder face may be provided with engaged, axial ribs and grooves if so desired, as is shown in the aforementioned copending application.

As the collar 6 approaches the reduced portion 4 of the threaded piston member, the O-ring 9 is axially compressed between the opposite radial faces of the two piston members as the piston member 8 moves inwardly of the receptacle 14. The O-ring correspondingly expands in a radial direction until it closes the gap near the cylinder face shown in FIG. 2, thereby interrupting communication between the compartments 18, 19.

The ring 9 is protected against damage under excessive axial pressure by abutting engagement of the collar 6 with the reduced piston portion 4. As soon as the O-ring 9 engages the cylinder face, it makes relative angular movement of the piston 2 and the cylinder 1 practically impossible even in the absence of engaged ribs and grooves. There is very little, if any, relative movement of the ring and cylinder while they are frictionally engaged, and wear of the ring 9 is nominal.

FIG. 2 is drawn substantially to scale. It shows that the overall axial length of the piston 2, as measured over the outer faces of the piston members 3, 4 and 8 which engage the inner cylinder face, is substantially greater than the piston or cylinder radius, and actually greater than three quarters of the piston diameter even when the piston member 8 moves to the limit of its stroke inwardly of the receptacle 14. The clearance required between the piston 2 and the cylinder 1 is too small to permit realistic representation on the scale of FIG. 2. The piston 2 is therefore precisely guided in the cylinder 1 in all operating conditions of the apparatus, and the transverse rigidity of the device under stresses unable to deform the metallic parts is determined by the seal in the plug 1c which may be made relatively rigid in a known manner, partly illustrated.

The cylinder-engaging face of the thickest and correspondingly rigid, metallic piston portion 3 extends over approximately one-half of the axial length of the piston, thereby preventing deformation of the piston even under very high bending stresses applied to the column, and backing the metallic cylinder to protect the latter against distortion. The grooves 23 are about as wide circumferentially as they are shown to be deep radially, and too few in number, typically three, offset 120°, to reduce the backing of the cylinder 1 by the piston 2 to a significant extent.

The aforedescribed extendable support column is simple and consists of relatively few parts because the O-ring 9 operates both as a valve which may be opened and closed from the outside for shifting or fixing the piston 2, and as a seal which prevents leakage between the compartments 18, 19 in the closed valve position.

The piston 2 provides precise radial guidance for the piston rod 11 and is movable in the cylinder 1 with very little friction if it is desired to change the column length. The column may therefore be provided with an air cushion of relatively low pressure which simplifies the construction, operation and maintenance of the column.

Obviously, many changes may be made in the illustrated embodiment without departing from the spirit and scope of the invention. While external grooves 23,24 have been chosen as conduits for connecting the compartments 18, 19 for the convenience with which such conduits are machined in the piston members 3, 8, other conduits may be formed in the piston members, and their orifices in the receptacle 14 need not necessarily be located near the inner cylinder face if the dimensions of the relaxed O-ring 9 are chosen to open a gap axially along the piston portion 4.

Other modifications will readily suggest themselves to those skilled in the art, and it should be understood that the invention is not limited to the example chosen for the purpose of the disclosure, but is to be construed broadly and limited solely by the scope of the appended claims.

What is claimed is:

1. An extendable support column comprising, in combination:
   a. a cylinder member having an axis and an inner face of uniform cross section transversely of said axis, said face bounding a cavity in said cylinder member;
   b. sealing means sealing said cavity from the ambient atmosphere;
   c. piston means axially movable in said cavity and dividing the same into two compartments varying in their capacity during axial movement of said piston means,
      1. said piston means including two piston members having respective axial faces conformingly engaging two axially spaced portions of said inner face and respective radially extending faces spacedly opposite each other and axially bounding a receptacle therebetween, the axial walls of said receptacle being constituted by said inner face and one of said piston members,
      2. each piston member being formed with a conduit having an orifice in said receptacle and one of said compartments;
   d. a piston rod axially movable relative to said cylinder member and having a first terminal portion axially projecting from said cylinder member and a second terminal portion in said cavity threadedly engaging one of said piston members, said terminal portions being connected for joint angular movement in respective planes transverse to said axis;
   e. abutment means on said second terminal portion engageable with the other piston member for moving the other piston member inwardly of said receptacle toward said one piston member when said first terminal portion is turned relative to said one piston member;
   f. a resilient member interposed between said radially extending faces and said axial walls in said receptacle, said resilient member being dimensioned 1. to define a gap with one of said axial walls when in the relaxed condition, the gap connecting the orifices of said conduits in said receptacle, and
2. to engage said wall and thereby to close said gap when compressed between said radially extending faces during movement of said other piston member inwardly of said receptacle; and g. a fluid filling said compartments, said recesses and said gap.

2. A column as set forth in claim 1, wherein said one piston member has a radially reduced portion, said other piston member being annular and slidably receiving said reduced portion therein.

3. A column as set forth in claim 1, wherein said axial faces of said piston members are formed with respective grooves open toward said inner face, said grooves constituting said conduits, said one axial wall of said receptacle being said inner face.

4. A column as set forth in claim 1, wherein said receptacle and said resilient member are annular about said axis.

5. A column as set forth in claim 4, wherein said resilient member is substantially tore-shaped when in said relaxed condition.

6. A column as set forth in claim 1, wherein the overall axial length of said piston means, as measured over said axial faces of said piston members, is at least equal to the radius of said inner face.

7. A column as set forth in claim 6, wherein the axial length of one of said axial faces is approximately equal to and not substantially smaller than one-half of said axial length of said piston means.

8. A column as set forth in claim 7, wherein said one axial face is said axial face of said one piston member.

9. A column as set forth in claim 8, wherein said one piston member has a radially reduced portion axially offset from said axial face thereof, said other piston member being annular and having a bore slidably receiving said reduced portion in conforming engagement.

* * * * *